June 6, 1967 W. HEIMES 3,323,299
DEVICE FOR CONTROLLING THE POSITION OF CONTROL ELEMENTS IN
STATIONARILY HELD BOBBIN CARRIERS, ESPECIALLY IN
TWO-FOR-ONE TWISTING SPINDLES
Filed Oct. 24, 1966 3 Sheets-Sheet 1

INVENTOR.
Willy Heimes
By
Walter Becker.

INVENTOR
Willy Heimes
By Walter Becker

INVENTOR.
Willy Heimes

United States Patent Office 3,323,299
Patented June 6, 1967

3,323,299
DEVICE FOR CONTROLLING THE POSITION OF CONTROL ELEMENTS IN STATIONARILY HELD BOBBIN CARRIERS, ESPECIALLY IN TWO-FOR-ONE TWISTING SPINDLES
Willy Heimes, Krefeld, Germany, assignor to Palitex Project-Company G.m.b.H., Krefeld, Germany
Filed Oct. 24, 1966, Ser. No. 588,920
Claims priority, application Germany, Oct. 26, 1965, P 37,961
21 Claims. (Cl. 57—58.83)

With two-for-one twisting spindles, the so-called delivery bobbin carrier with a hollow spindle shank is freely rotatably mounted relative to the spindle rotor on the turntable and above the spindle rotor, while the said bobbin carrier is prevented from rotation by means of pairs of magnets. The arrangement is such that some magnetic bodies are connected to the bobbin carrier, whereas the other magnetic bodies are arranged stationarily outside said carrier. When the spindle is in operation, the thread to be twisted orbits in the form of a balloon around the stationarily mounted bobbin carrier so that there exists no possibility from the outside radially mechanically to establish a connection with movable control elements in the interior of the bobbin carrier in order to bring about an adjustment of said control elements during the orbiting movement of the thread.

Control elements in the interior of the bobbin carrier may, for instance, be employed for adjusting the thread brakes, the drag flier brakes or other aids for the thread.

The simplest and most diversified control movements can be realized by means of electromagnets, which, however, as a rule require that the control magnets are continuously under current which is varied as to its magnitude for the respective control to be carried out. Such an arrangement, however, may in view of the great number of spindles of one or more machines incur a considerable consumption of current which in some instances may affect the economy of this type of control of the movable parts within the bobbin carrier.

It is, therefore, an object of the present invention to provide a device especially for use in connection with two-for-one twisting spindles, for adjusting the position of control elements, in particular of control elements controlling the course of the thread in the stationarily journalled carrier for the delivery bobbin.

It is another object of this invention to provide a device as set forth in the preceding paragraph in which an energy supply in the form of electric current will be required only for the duration of the adjustment of the respective control elements.

These and other objects and advantages of the invention will appear more clearly from the following specification in connection with the accompanying drawings, in which:

FIG. 1 diagrammatically illustrates a partial section through a two-for-one twisting spindle with a thread brake arranged in the hollow shank of the spindle and adapted to be actuated mechanically by an impulse step control device.

Figure 1:
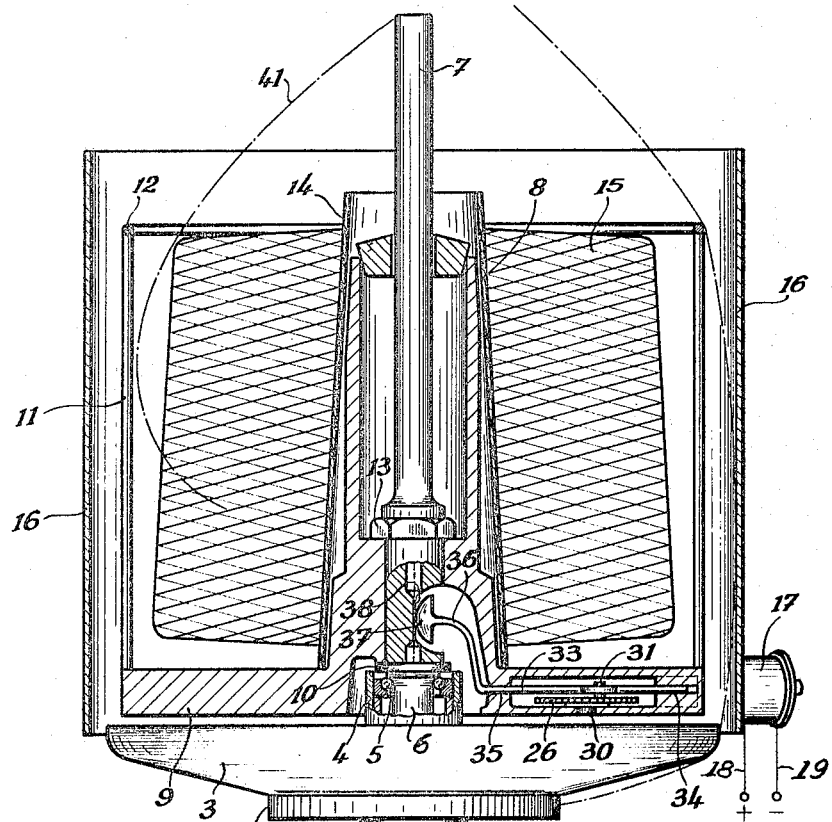

The invention is seen primarily in that outside the carrier for the delivery bobbin, and independently thereof, there is provided at least one electromagnet-impulse emitter which in said bobbin carrier has associated therewith an impulse step control device which in response to each impulse changes the position of at least one control member within the possible range of movement thereof.

The release of the control movements thus requires only individual short current impulses so that the current consumption will be maintained extremely low. A particular advantage of such an arrangement is seen in the fact that the application of control impulses makes possible the release or initiation of very short individual steps during the movement of the control elements and the magnitude of the force exerted by the control element is directly dependent on the total number of the carried-out impulse steps.

The present invention also embraces the possibility to make that control member which affects the course of the thread and pertains to the bobbin carrier a part of a thread aid arranged at the free end of the hollow spindle shank. Such aid may have the form of a bell-shaped body which is dragged by the thread and which affects the entry of the thread on its way from the delivery bobbin into the hollow shank of the spindle so as to impart upon the thread a more uniform movement while avoiding sharp deviating angles. Also in this instance, according to the present invention, a control member controlled by the impulse step control device may affect the drag operation.

The control of control elements within the delivery bobbin carrier, according to the present invention, makes it possible to make the control dependent on other functions. To this end, the present invention provides that the electromagnet-impulse emitter cooperates with auxiliary elements of the spindle which when becoming effective bring about actuation of the electromagnet-impulse emitter. Thus, the impulse emitter may become effective with a turning on or turning off operation, more specifically, with the turning on operation in such a way that for instance the thread brake becomes effective with a predetermined braking value. When turning off, the thread brake will relieve the thread passage for purposes of facilitating the threading.

According to the invention, the electro impulse emitter may also be made responsive by a thread guard for instance in such a way that a thread guard makes through the electro impulse emitter a thread brake directly effective which is located within the bobbin carrier and brings about that the thread will be completely prevented from further passing through.

A similar effect may also be obtained according to the present invention by making the electro impulse emitter effective by a measuring device which measures the woundup length of the thread. In this instance, it is thus possible after a certain length of the thread has been wound up, to stop the thread pull-through through the hollow shank of the bobbin carrier.

According to a further development of the present invention, the electromagnet-impulse emitters of a plurality of spindles or of a machine or of a plurality of machines may be caused centrally to respond in unison. Thus, a plurality of movable elements in the bobbin carrier may be controlled together and simultaneously for bringing about certain movements, for instance to increase the braking of the thread passing through the spindle or for reducing or stopping the passing of the thread.

Referring now to the drawings in detail, the general design of the two-for-one twisting spindles in the various figures is substantially the same and, therefore, those features which are common to all of the embodiments may be referred to first. More specifically, the spindle rotor comprises a whorl 1 adapted to be driven by a tangential flat belt (not illustrated) in a manner per se. The spindle rotor furthermore comprises a thread storage disc 2 which is connected to whorl 1 and carries a turntable 3. Turntable 3 is provided with the bearing hub 4 in which anti-friction bearings 5 are mounted, the upper one of said anti-friction bearings only being shown. By means of the anti-fraction bearings 5, the end portion 6 of the hollow spindle shank 7 is freely rotatably journalled in the turntable 3 or, more specifically, its bearing hub 4.

Figure 5:
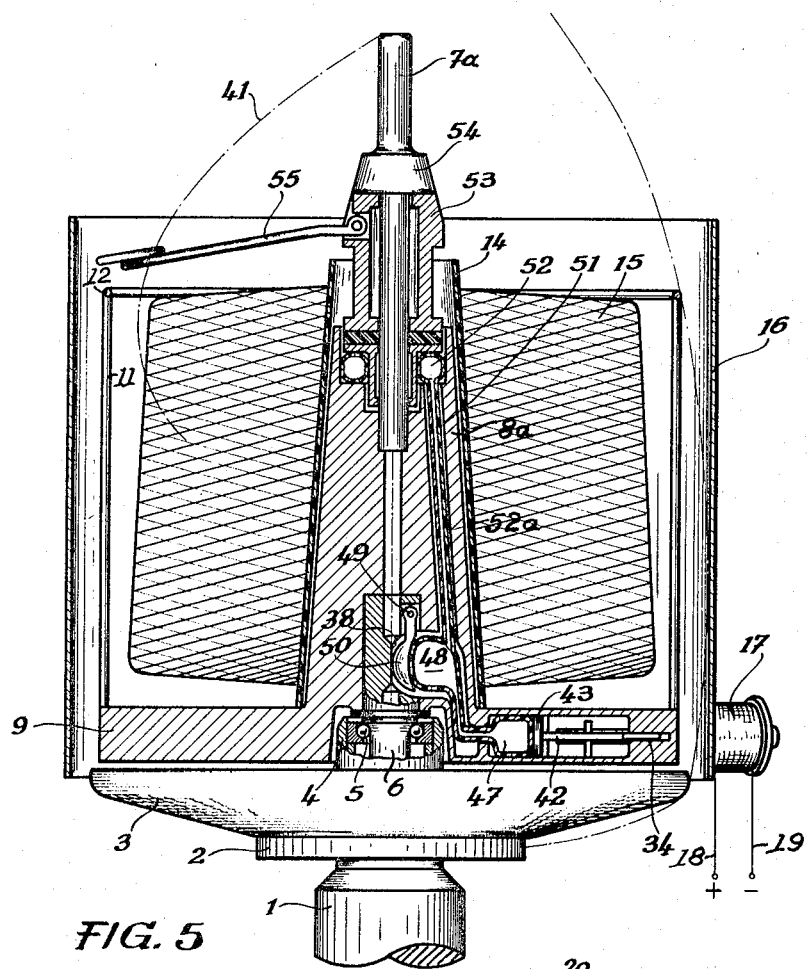
FIG. 5 is a diagrammatic illustration of a partial section through a two-for-one twisting spindle with a thread brake adapted to be controlled hydraulically by means of an impulse step control device, and with a drag fly brake adapted to be controlled at the same time.

The hollow spindle shank 7 is surrounded by the delivery bobbin carrier 8 with the dish-shaped bottom 9 hence forth called bobbin pot, which has either a cylindrical pot wall or has cylindrically distributed pot struts 11 the upper free ends of which are interconnected in conformity with FIGS. 1 and 5 by a thread repulsing ring 12. The bobbin pot 8 rests on an annular flange 10 of the hollow spindle shank 7 in axial direction and is prevented from accidental withdrawing in upward direction by means of a nut 13.

The bobbin pot 8 is, for instance at the outer marginal portion of the bottom 9 or at about half the height of the bobbin pot 8, provided with magnetic bodies (not shown) which have associated therewith permanent magnets arranged stationarily outside the spindle and adapted to hold the bobbin pot stationary so that it will not rotate together with the spindle rotor. The delivery bobbin 14 with the yarn body 15 is mounted on the bobbin carrier 8. Magnetic bodies and permanent magnets of the above type are disclosed e.g. in U.S. Patent No. 3,159,962.

A balloon restrainer 16, which is connected to the machine frame (not shown) extends around the bobbin pot 8. It is, of course, to be undersetood that instead of a cylindrical balloon restrainer 16, also separators may be employed which at the same time may serve as support for the permanent magnets which prevent the bobbin pot 8 from rotating together with the spindle rotor.

The balloon restrainer 16, or in case separators are employed, such separators support an electromagnet-impulse emitter 17 which receives its impulse through the conductors 18, 19. Radially opposite the electromagnet-impulse emitter 17 there is located in the bottom wall 9 of the bobbin pot 8 or in the pot wall the impulse step control device. In this way, a radial enlargement of the bobbin pot is avoided which would exceed the size determined by the size of the bobbins.

Figure 2:
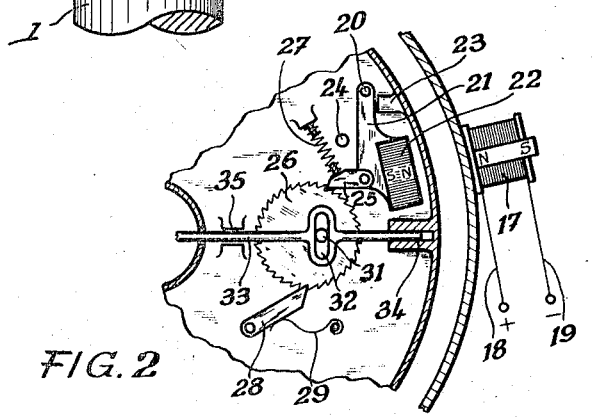
FIG. 2 is a diagrammatic illustration of a partial section through the bottom of the bobbin pot according to FIG. 1 with an impulse control device arranged therein.

According to FIGS. 1 and 2, the impulse step control device comprises a tiltable lever 21 pivotally journalled at 20 and provided with a magnet 22 which is directly radially oppositely located with regard to the electromagnet-impulse emitter 17. The turning stroke of lever 21 is defined by the abutments 23 and 24. Pivotally connected to lever 21 is a control pawl 25 which by means of a longitudinally guided spring 27 is continuously urged into engagement with a saw tooth wheel 26. On the opposite side, the said wheel 26 is engaged by a pivotally journalled retaining pawl 28 which is adapted to tilt away from saw tooth wheel 26 against the thrust of a spring 29 which in its turn continuously urges the pawl 28 into engagement with wheel 26.

Wheel 26, which is freely rotatably journalled in the bottom wall 9 of bobbin pot 8 by means of a stud 30, has its upper side provided with an eccentric pin 31 engaging a transverse slot 32 of a radially displaceable bar 33, said bar being laterally guided at 34 and 35. As will be evident from FIG. 1, the inner end of bar 33 forms a brake arm 36 which is elastically radially outwardly bendable. In view of this elasticity, the radial displacement of bar 33 toward the inside increases the pressure at which the brake head 37 is pressed against the braking surface 38. A radial withdrawal of brake head 37 results in a decrease of the braking pressure. The adjusting movements are carried out by the saw tooth disc 26 by means of the eccentric pin or pivot 31. The double eccentricity of pivot 31 represents the maximum displacement stroke of bar 33. With each current impulse received by the electro impulse emitter 17, lever 21 is turned radially inwardly until it engages the abutment 24 so that disc 26 is turned correspondingly. With each impulse, a further rotation takes place while the retaining pawl 28 prevents a rearward rotation.

The pivotal movement of lever 21 by means of the electro impulse emitter is due to the fact that in the embodiment shown, the north poles of the electro impulse emitter and of the impulse step control device are located opposite to each other. In summary, it may be said that the just described device makes possible stepwise a rotation of the saw tooth disc 26 with a corresponding movement of the control member while a return movement, as mentioned above, is made impossible by the retaining pawl 28. The control pawl 25 turns disc 26 stepwise inasmuch as the pivotally journalled magnet will with each impulse carry out a pivotal movement by means of which the control pawl 25 rotates disc 26 by one tooth.

Figure 3:
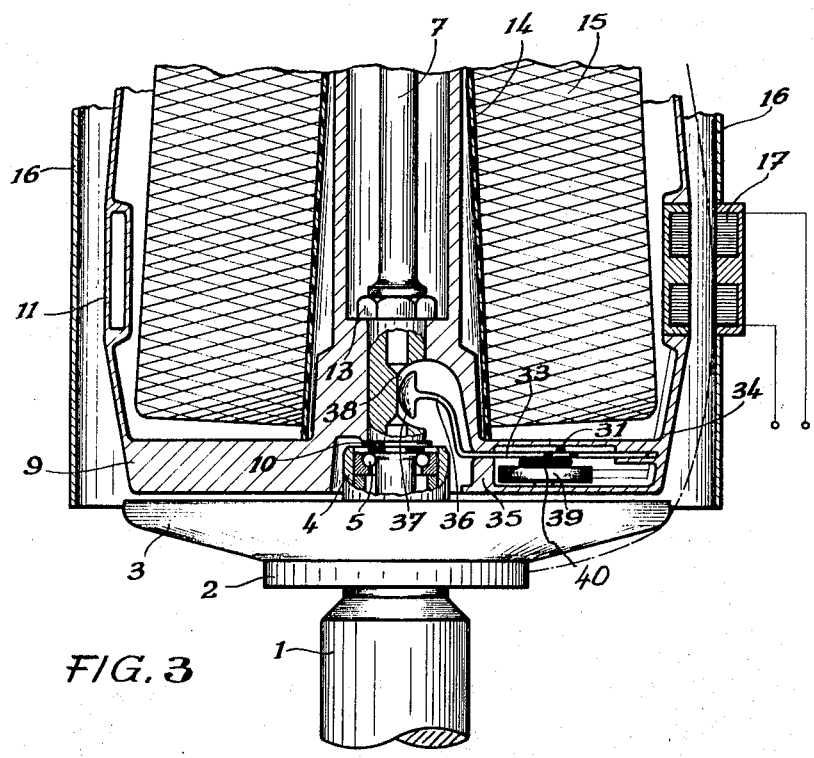
FIG. 3 is a diagrammatic illustration of a partial section through a two-for-one twisting spindle with a thread brake similar to that of FIG. 1 but controllable by means of a step control electric motor.
Figure 4:
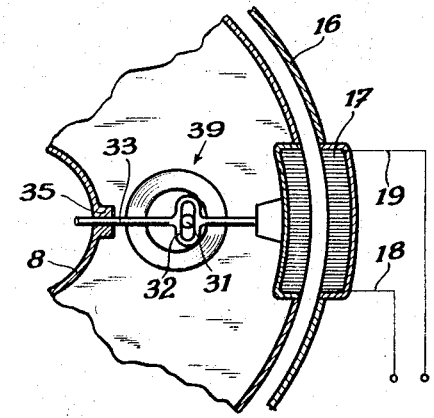
FIG. 4 is a partial section through the bobbin pot according to FIG. 3 with the step control electric motor arranged therein.

The embodiment illustrated in FIGS. 3 and 4 differs from that of FIGS. 1 and 2 primarily in that the step control device according to FIGS. 1 and 2, which comprises a plurality of fine mechanical elements, has been replaced by a step control electric motor generally designated 39. Step control electric motors of this type are known in numerous forms and also of very small dimensions which make possible the mounting thereof within the delivery bobbin carrier, for instance the bobbin pot, without affecting the space required for the bobbin. Inasmuch as this step control electric motor may be any standard motor available in the trade, a detailed description of said motor appears to be superfluous. In the specific showing of FIGS. 3 and 4, the impulse emitter 17 forms the primary part and is arranged within the range of the maximum bulge portion of the thread balloon above the bottom 9 of the spool pot 8. At the same level there is provided the secondary part forming an element of the step control device and located radially opposite the impulse emitter 17.

The rotor 40 of motor 39, similar to the saw tooth disc 26 of FIGS. 1 and 2, carries an eccentric pin 31 which, as has been described in connection with FIGS. 1 and 2, brings about the radial movements of a bar 33 of the brake arm 36 so that the same operation and the same influence upon the thread 41 passing through hollow spindle shank 7 will be realized.

Figure 6:
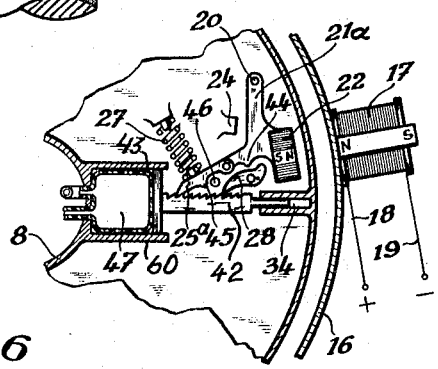
FIG. 6 is a partial section through the bottom of the bobbin pot according to FIG. 5 with a saw tooth step control device arranged therein.

FIGS. 5 and 6 illustrate a further embodiment of the invention which as far as the design of the impulse step control device is concerned is very similar to that of FIGS. 1 and 2. The operation of this modification is the same as described in connection with the saw tooth disc 26 with the exception that the control pawl does not bring about a rotary movement but a rectilinear movement of a control member. More specifically, the saw tooth disc 26 of FIGS. 1 and 2 has been replaced by a saw tooth rack 42 the ends of which are radially guided at 34 and in the cylinder 60. The teeth of rack 42 are adapted to be engaged by control pawl 25a which is biased into engagement with rack 42 by a spring 27.

Lever 21a, which is pivotally connected to pivot 20, is adapted to move radially inwardly up to a maximum when it engages the shoulder 24. Lever 21a again is provided with a magnet 22 which is located opposite to the electric impulse emitter 17, with the pawls of the two elements facing each other. At that side of rack 42 which carries the teeth, there is provided a retaining pawl 28 having associated therewith a cam 44 on lever 21a.

Furthermore, control pawl 25a is provided with a cam 45 with a pin 46 in close proximity thereto.

The emission of an impulse will by means of magnet 22 pivot lever 21a radially inwardly until it abuts the abutment 24. This tilting movement brings about an advancement of rack 42 by a corresponding stroke. By a plurality of impulses, rack 42 can be advanced radially inwardly to a greater or less extent. The return movement is effected by reversing the poles of the electric impulse emitter 17 so that lever 21a pivots radially outwardly. In this way, control pawl 25a moves by means of its cam 25 onto pin 26 and will thus be lifted out of the teeth of rack 42. At the same time, cam 44 on lever 21a moves over the bent outer end of the retaining pawl 28 so that also the latter is lifted out of the teeth of rack 42. Consequently, rack 42 can now freely radially move outwardly. Thus, a particular advantage of the impulse step control device employed according to the invention consists in that a single impulse will suffice for moving the control member to its starting position.

The brake movement is due to the radially inwardly directed end of rack 42 pressing by means of a head plate 43 against a bellows 47 filled with a hydraulic medium, which bellows, with the rack 42 moved radially inwardly, presses its hydraulic medium into the bellows 48 which in turn presses the brake head 50 pivoted at 49 against the braking surface 38 in the hollow spindle shank 7a.

It may be mentioned that according to FIGS. 5 and 6, the bobbin carrier 8a centrally extends to a considerable extent in upward direction and that the hollow spindle shank 7 is inserted only into the upper end of carrier 8a. Bobbin carrier 8a has provided therein conduit means 51 extending up to the upper end of carrier 8a. Provided in said conduit means 51 there is a hose 52a which communicates with the bellows 48 and has its upper end leading into an annular hose 52 which may form a single piece with said hose 52a. When in view of the radial displacement of the rack 42, bellows 47 is compressed, not only bellows 48 will be broadened which more or less strongly presses the brake head 50 radially against the braking surface 38, but also the annular hose 52 will widen with the result that sleeve 53 resting thereon will more or less strongly be pressed against the collar 54 of the hollow spindle shank 7a. As a result thereof, the sleeve 53 which is dragged by the thread 41 through the intervention of the drag flier 55 will be braked to a greater or less extent. The drag flier brake generally consists of a flier journalled at the upper end of the hollow spindle shank, which flier is dragged around by the thread. It may be of advantage to control the magnitude of the resistance offered by the drag flier to the circulation by means of the thread. This control may, as mentioned above, be effected by means of a control element which receives its movements from the impulse step control device.

The embodiment of FIGS. 5 and 6 thus shows a possibility how by means of a single electro impulse emitter and a single impulse step control device it is possible simultaneously to control two elements namely the brake head 50 and the circulation or turning movement of the drag flier 55 so that by means of the latter, the withdrawal of the thread from the yarn body 15 can be controlled to the desired extent.

As mentioned above, hydraulic connections between the impulse step control device and the control member affecting the thread movement can be particularly easily realized because for the hydraulic medium, bores or the like suffice which can have an angular or curved course or extension. In contradistinction to the embodiment referred to above, it is also possible to arrange parts affecting the thread on or in the bobbin carrier in the range of the upper outer edge 12 in order at this point to exert an influence upon the thread circulation. For instance, the drag flier according to FIG. 5 may with more or less friction rest upon the rim 12 in order to be able from the outside instead of from the hub to affect the circulation of the drag flier 55. In this instance, for instance, an annular bellows may extend along the rim 12 of FIG. 5, which bellows, similar to the annular hose 52 would be hydraulically expanded to a greater or less extent so that the drag flier 55 would more or less rest upon the bellows. The connection between such a bellows with the bellows 47 could be effected by a passage extending within one of the bars 11 of the bobbin pot. The thread passing through the spindle may also be stopped by an impulse emission brought about by the thread guard or a length measuring device. Also a cooperation with the spindle brakes is possible. This could be realized in such a way that in response to the actuation of the spindle brake such impulse emission is effected that the thread brakes illustrated in the drawings will completely relieve the thread passing through the hollow spindle shank. On the other hand, the braking force can be made effective by an impulse emission when the spindle brake relieves the rotation of the spindle.

As will be seen from the above, due to the fact that the impulse step control device is connected directly to a displaceable control member which is hydraulically or pneumatically or mechanically connected to at least one control element affecting the thread movement, which control element is located in the stationarily journalled bobbin carrier, there is realized the possibility of actuating also such control elements affecting the movement of the thread which are located relatively far from the impulse step control device proper.

It is, of course, to be understood that the present invention is, by no means, limited to the particular embodiments referred to above but also comprises any modifications within the scope of the appended claims. Thus, the illustrated control elements may be connected to the impulse step control device of one or the other design also pneumatically, mechanically, or hydraulically by other elements than those shown in the drawings.

What I claim is:

1. A device for use in connection with a two-for-one twisting spindle for varying the position of control means, especially of a thread control, which includes: bobbin carrier means adapted to be held stationary, movable means associated with and movable relative to said bobbin carrier means, first control means arranged in movable relationship to said movable means for controlling the latter, electromagnetic impulse emitting means arranged outside and independently of said bobbin carrier means and operable selectively to emit an electric impulse, and second control means designed as electric impulse responsive step control means arranged within said bobbin carrier means and operatively connected to said first control means, said step control means being operable in response to an impulse released by said impulse emitting means to bring about a stepwise adjustment of said first control means.

2. A device according to claim 1, which includes: a displaceable member arranged in said bobbin carrier means and operable by said step control means, and mechanical means operatively connecting said displaceable member to said first control means.

3. A device according to claim 1, which includes a displaceable member arranged in said bobbin carrier means and operable by said step control means, and fluid operable means operatively connecting said displaceable member to said first control means.

4. A device according to claim 1, in which said step control means includes a rotatable member having eccentrically linked thereto a displaceable member arranged in said bobbin carrier means and operatively connected to said first control means for actuating the same.

5. A device according to claim 1, in which said step control means is formed by a step control electric motor.

6. A device according to claim 1, in which said step control means includes a ratchet wheel rotatably journalled in said bobbin carrier means, magnet means pivotably supported in said bobbin carrier means and arranged for cooperation with said electromagnetic impulse emitting means, an advancing pawl pivotally connected to said magnet means for cooperation with said ratchet wheel, and a retaining pawl continuously urged into engagement with said ratchet wheel for retaining the latter in its respective position into which it has been moved by said advancing pawl.

7. A device according to claim 1, in which said step control means includes a rack reciprocably mounted in said bobbin carrier means, magnet means pivotably supported in said bobbin carrier means and arranged for cooperation with said electromagnetic impulse emitting means, an advancing pawl pivotally connected to said magnet means for cooperation with said rack, a retaining pawl for retaining said rack in its respective position into which it has been moved by said advancing pawl, and means operable by said rack for actuating said first control means.

8. A device according to claim 1, which includes elastically compressible bellows means interposed between said electric impulse responsive step control means and said first control means for actuating the latter.

9. In a two-for-one twisting spindle arrangement having a spindle rotor: bobbin carrier means adapted to be journalled stationarily on said spindle rotor and provided with a substantially centrally located elevated portion having an axial passage therethrough, a hollow spindle shank having its lower end arranged in the upper portion of said passage and having its interior in communication with said passage for passing a thread through said shank into said spindle rotor, said spindle shank having its upper portion provided with a braking surface, first elastically expandable means supported by the upper portion of said elevated portion, first control means interposed between said braking surface and said first elastically expandable means and operable by the latter to exert a braking effect upon said braking surface, thread braking means arranged on said elevated portion in the vicinity of a portion of said passage which is below the lower end of said spindle shank for selectively exerting a braking effect on a thread passing through said passage portion, electromagnetic impulse emitting means arranged outside and independently of said bobbin carrier means and operable selectively to emit an electric impulse, electric impulse responsive step control means arranged within said bobbin carrier means, second elastically expandable means interposed between and operatively connected to said thread braking means and said step control means for selectively actuating said thread braking means, and conduit means establishing fluid communication between said first and said second elastically expandable means.

10. In a two-for-one twisting spindle system having rotor means: bobbin carrier means having thread conveying means therein and being adapted to be stationarily supported by said rotor means, first and second thread control means supported by said bobbin carrier means in spaced relationship to each other and in the vicinity of said thread conveying means, electromagnetic impulse emitting means arranged outside and independently of said bobbin carrier means and operable selectively to emit an electromagnetic impulse, electromagnetic impulse responsive step control means supported by said bobbin carrier means and located opposite said impulse emitting means, and means operatively interconnecting said step control means and said first and second thread control means.

11. A device according to claim 1, in which said bobbin carrier means includes chamber means having said step control means arranged therein.

12. A device according to claim 1, in which said first control means forms a part of a thread brake.

13. A device according to claim 1, in which said first control means includes a brake head and an elastic radially bendable arm supporting said head, and in which said step control means includes a radially reciprocable member connected to said arm.

14. A device according to claim 1, in which said step control means includes a rotatable member with a pin eccentrically mounted thereon, and in which said first control means includes a radially reciprocable member engaged and operable by said pin.

15. A device according to claim 14, in which said rotatable member is formed by a ratchet wheel, and pawl means for cooperation with said ratchet wheel to move the latter by steps.

16. A spindle system according to claim 10, in which said first thread control means forms a part of a drag flyer brake.

17. A spindle system according to claim 10, in which said second thread control means forms part of a device controlling the movement of the thread toward said rotor means.

18. A device according to claim 1, which includes auxiliary means associated with said spindle and controlling the actuation of said electromagnetic impulse emitting means.

19. A device according to claim 18, in which said auxiliary means includes broken thread end detecting means.

20. A device according to claim 18, in which said auxiliary means includes measuring means measuring the length of the thread wound upon a bobbin on said bobbin carrier means.

21. A device according to claim 1, in which said electromagnetic impulse emitting means is operatively connected to a plurality of spindles for controlling same.

References Cited

UNITED STATES PATENTS

| | | | |
|---|---|---|---|
| 2,715,308 | 8/1955 | Soussloff et al. | 57—58.76 X |
| 2,803,939 | 8/1957 | Steele | 57—58.83 X |
| 2,834,178 | 5/1958 | Klein | 57—58.83 X |
| 3,052,080 | 9/1962 | Otten et al. | 57—58.83 X |
| 3,172,247 | 3/1965 | Chapuis et al. | 57—58.72 |

FOREIGN PATENTS 929,896   1/1948   France.

FRANK J. COHEN, *Primary Examiner.*

D. E. WATKINS, *Assistant Examiner.*